United States Patent
Lee et al.

(10) Patent No.: US 9,653,991 B2
(45) Date of Patent: May 16, 2017

(54) POWER CONVERTER AND DRIVING METHOD FOR THE SAME

(71) Applicant: SOLUM CO., LTD., Suwon-si (KR)

(72) Inventors: Man Dong Lee, Suwon-si (KR); Seung Kon Kong, Suwon-si (KR); Hyun Ku Kang, Seoul (KR); Dae Hoon Han, Namyangju-si (KR); Jung Eui Park, Suwon-si (KR)

(73) Assignee: Solum Co., Ltd., Suwon-si (KR)

( * ) Notice: Subject to any disclaimer, the term of this patent is extended or adjusted under 35 U.S.C. 154(b) by 68 days.

(21) Appl. No.: 14/681,325

(22) Filed: Apr. 8, 2015

(65) Prior Publication Data

US 2015/0288280 A1    Oct. 8, 2015

(30) Foreign Application Priority Data

Apr. 8, 2014    (KR) .......................... 10-2014-0041813

(51) Int. Cl.
*H02M 3/156* (2006.01)
*H05B 33/08* (2006.01)

(52) U.S. Cl.
CPC ........ *H02M 3/156* (2013.01); *H05B 33/0818* (2013.01); *Y02B 20/347* (2013.01)

(58) Field of Classification Search
CPC .... H02M 3/156; H02M 3/1563; H02M 3/158; H02M 2001/0058
See application file for complete search history.

(56) References Cited

U.S. PATENT DOCUMENTS

| | | | | |
|---|---|---|---|---|
| 4,764,856 A * | 8/1988 | Rausch | ............. | H02M 3/33507 323/285 |
| 4,807,147 A * | 2/1989 | Halbert | ............... | H03M 1/1255 324/76.15 |
| 7,075,050 B2 * | 7/2006 | Mizuno | ..................... | G01J 1/44 250/214 R |
| 7,868,602 B2 * | 1/2011 | Omi | ........................ | H02M 1/36 323/284 |
| 7,932,772 B1 * | 4/2011 | Zarabadi | ............... | H02M 3/073 327/539 |
| 8,134,374 B2 * | 3/2012 | Kuang | ............... | G01R 27/2605 324/658 |

(Continued)

FOREIGN PATENT DOCUMENTS

CN    102105005 A    6/2011
CN    104917357 A    9/2015

OTHER PUBLICATIONS

Chinese Office Action issued on Feb. 8, 2017 in counterpart Chinese Patent Application No. 201510163167.4 (16 pages, in Chinese with English translation).

*Primary Examiner* — Timothy J Dole
*Assistant Examiner* — Yusef Ahmed
(74) *Attorney, Agent, or Firm* — NSIP Law

(57) ABSTRACT

A power converter may include an inductor, a switch turned on or turned off according to a control signal to control the flow of a current flowing through the inductor, and a control unit for outputting the control signal to turn on or turn off the switch by integrating a current flowing through the switch to compare the integrated current with the size of a preset reference voltage. The power converter and a driving method for the same may reduce errors of current control and have a simple structure.

13 Claims, 4 Drawing Sheets

(56) References Cited

U.S. PATENT DOCUMENTS

| | | | |
|---|---|---|---|
| 8,476,888 B1* | 7/2013 | Chen | H02M 3/156 323/284 |
| 2007/0001893 A1* | 1/2007 | Shinohara | H03M 1/002 341/169 |
| 2009/0284237 A1* | 11/2009 | Kitagawa | H02M 3/156 323/282 |
| 2009/0302774 A1 | 12/2009 | Mednik et al. | |
| 2010/0013502 A1 | 1/2010 | Kuang | |
| 2010/0244801 A1 | 9/2010 | Arora et al. | |
| 2011/0068768 A1* | 3/2011 | Chen | H02M 3/156 323/351 |
| 2011/0140627 A1 | 6/2011 | Kong et al. | |
| 2012/0049753 A1* | 3/2012 | Hwang | H05B 33/0818 315/224 |
| 2012/0161662 A1* | 6/2012 | Kim | H05B 33/0818 315/246 |
| 2012/0170335 A1* | 7/2012 | Lee | H02M 3/156 363/89 |
| 2012/0280630 A1* | 11/2012 | Lu | H05B 33/0851 315/188 |
| 2013/0335052 A1* | 12/2013 | Li | G05F 1/618 323/285 |
| 2014/0043879 A1* | 2/2014 | Eum | H02M 7/217 363/89 |
| 2014/0184187 A1* | 7/2014 | Hwang | H02M 3/157 323/283 |
| 2014/0218223 A1* | 8/2014 | Darshan | H03M 3/474 341/143 |
| 2015/0069990 A1* | 3/2015 | Feldtkeller | H02M 3/158 323/284 |
| 2015/0222256 A1* | 8/2015 | Sasai | H03K 5/1252 327/551 |
| 2015/0256068 A1* | 9/2015 | Shin | H02M 3/156 323/282 |
| 2015/0288279 A1* | 10/2015 | Lee | H02M 1/36 323/282 |
| 2015/0293545 A1* | 10/2015 | Cui | G05F 1/46 323/281 |
| 2015/0340945 A1* | 11/2015 | Kwon | H02M 3/04 323/234 |

* cited by examiner

POWER CONVERTER AND DRIVING METHOD FOR THE SAME

CROSS-REFERENCE TO RELATED APPLICATION

This application claims the priority and benefit under 35 U.S.C. Section 119 of Korean Patent Application Serial No. 10-2014-0041813, filed on Apr. 8, 2014, with Korean Intellectual Property Office, which is hereby incorporated by reference in its entirety into this application.

BACKGROUND

1. Technical Field

Some embodiments of the present disclosure may relate to a power converter and a driving method for the same.

2. Description of the Related Art

In general, switch mode power supplies such as buck converters and flyback converters are used in a wide range of electronic equipment. The switch mode power supplies can generate a voltage by controlling the flow of a current. However, when the size of the flowing current does not reach a predetermined value, the generated voltage may occur an error. Thus, the electronic equipment which receives power through the switch mode power supplies may malfunction.

SUMMARY

Some embodiments of the present disclosure may provide a power converter which can reduce errors of current control and a driving method for the same.

Additionally, some embodiments of the present disclosure may provide a power converter having a simple structure and a driving method for the same.

In accordance with a first embodiment of the present disclosure, a power converter may include: an inductor; a switch turned on or turned off according to or in response to a control signal to control the flow of a current flowing through the inductor; and a control unit configured to output the control signal to turn on or turn off the switch by integrating a current flowing through the switch to compare the integrated current with the size of a preset reference voltage.

In accordance with a second embodiment of the present disclosure, there may be provided a driving method for a power converter, which may generate predetermined power by detecting a current flowing through a switch and controlling the switch to switch a current flowing through an inductor. The method may include: flowing the current through the inductor by turning on the switch; detecting the size of the current flowing through the switch and comparing the current flowing through the switch with a preset reference current; and turning off the switch when the size of the current flowing through the inductor becomes equal to the size of the reference current.

In accordance with a third embodiment of the present disclosure, there may be provided a driving method for a power converter, which may generate predetermined power by making an average current of a current flowing through a switch in a turn-on period of the switch equal to a reference current through adjustment of the turn-on period and a turn-off period of the switch to control a current flowing through an inductor. The method may include: storing a first voltage in a first capacitor by integrating the current flowing through the switch in a period of a turn-on period of the switch in which the current flowing through the switch is smaller than a reference current; and storing a second voltage in the first capacitor by integrating the current flowing through the switch in a period of the turn-on period of the switch in which the current flowing through the switch is greater than the reference current after the turn-off period and adding the first voltage and the second voltage.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
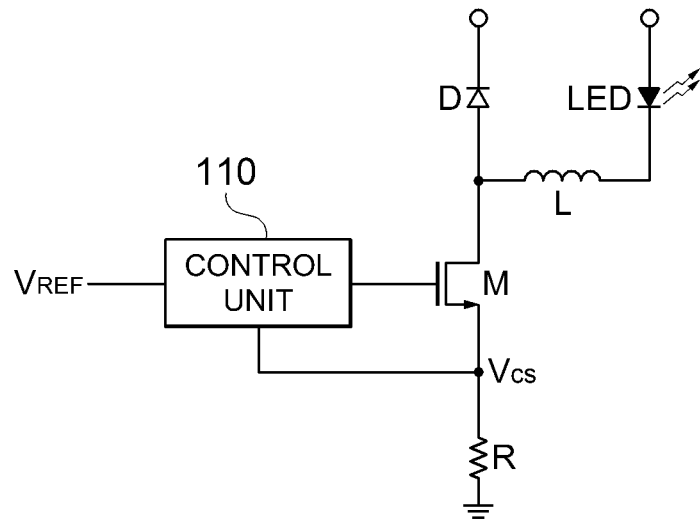
FIG. 1 is a structural diagram showing a power converter in accordance with an exemplary embodiment of the present disclosure.

A matter regarding to an operational effect including a technical configuration for an object of a power converter and a driving method for the same in accordance with the present invention will be clearly appreciated through the following detailed description with reference to the accompanying drawings showing preferable embodiments of the present invention.

Further, in describing the present invention, descriptions of well-known techniques are omitted so as not to unnecessarily obscure the embodiments of the present invention. In the present specification, the terms "first," "second," and the like are used for distinguishing one element from another, and the elements are not limited by the above terms.

In the following detailed description of the present invention, reference is made to the accompanying drawings that show, by way of illustration, specific embodiments in which the present invention may be practiced. These embodiments are described in sufficient detail to enable those skilled in the art to practice the embodiments. It is to be understood that the various embodiments, although different, are not necessarily mutually exclusive. For example, a particular feature, structure, or characteristic described herein, in connection with one embodiment, may be implemented within other embodiments without departing from the spirit and scope of the embodiments. In addition, it is to be understood that the location or arrangement of individual elements within each disclosed embodiment may be modified without departing from the spirit and scope of the embodiments. Therefore, the following detailed description is, therefore, not to be taken in a limiting sense, and the scope of the embodiments is defined only by the appended claims, appropriately interpreted, along with the full range of equivalents to which the claims are entitled. In the drawings, like numerals refer to the same or similar functionality throughout the several views.

Hereinafter, embodiments of the present invention will be described in detail with reference to the accompanying drawings so that those skilled in the art can easily practice the present invention.

FIG. 1 is a structural diagram showing a power converter in accordance with the present invention.

Referring to FIG. 1, a power converter 100 may include an inductor L, a switch M and a control unit 110. The switch M may be turned on or turned off according to or responding to a control signal to control the flow of a current flowing through the inductor L. The control unit 110 may output the control signal for turning on or turning off the switch M by integrating a current flowing through the switch M and comparing the integrated current with a preset reference voltage. Further, the power converter 100 may further include a light emitting diode (LED) and a rectifier including a diode D. A current may flow through the LED by operation of the switch M to emit light.

The inductor L may be connected to the switch M and may generate a predetermined voltage by flowing or blocking the current according to the switching operation of the switch M.

One end of the switch M may be connected to the inductor L and the other end of the switch M may be connected to a resistor R. The turn-on or turn-off operation of the switch M may be determined according to the control signal. The switch M may receive the current flowing through the inductor L when turned on, and transmit the current to the resistor R. For example, the switch M may be a metal-oxide-semiconductor (MOS) transistor, and the control signal may be transmitted to a gate electrode of the transistor to control the turn-on or turn-off operation of the transistor. When the transistor is turned on, a current can flow from a first electrode to a second electrode of the transistor so that the current can flow through the inductor L. The first electrode and the second electrode of the transistor may be a source electrode and a drain electrode, but are not limited thereto.

The control unit 110 may detect the size of the current flowing through the switch M and output the control signal for controlling the turn-on or turn-off operation of the switch M in response to the current flowing through the switch M. To this end, the control unit 110 may compare a voltage Vcs, generated by the resistor R by the current flowing through the switch M, with a preset reference voltage $V_{REF}$, and output the control signal according to the result of the comparison to control the turn-on/turn-off operation of the switch M. The size of the current flowing through the switch M may be controlled or adjusted by adjusting a turn-on time and a turn-off time of the switch M according to the pulse width of the control signal. The reference voltage $V_{REF}$ may be a voltage which is applied to the LED to emit light with reference brightness. Therefore, in order to make the current flowing through the switch M equal to the reference current, the control unit 110 may detect the reference voltage $V_{REF}$ and output the control signal for turning off the switch M to make an average of the current flowing through the switch M during the turn-on of the switch M equal to the reference voltage $V_{REF}$ when the current flowing through the switch M is greater than the reference current.

Therefore, the power converter 100 according to the present invention can improve the accuracy of current control by checking the size of the current flowing through the switch M and making the average of the size of the current flowing through the switch M equal to the reference current, thereby reducing the error of the power converter.

Figure 2:
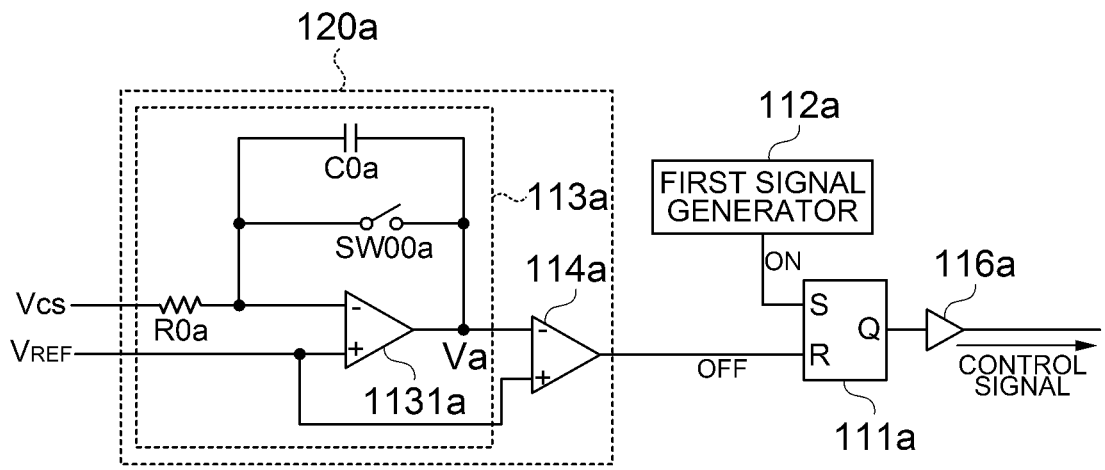
FIG. 2 is a circuit diagram showing a first embodiment of a control unit employed in the power converter shown in FIG. 1.

FIG. 2 is a circuit diagram showing a first embodiment of the control unit employed in the power converter shown in FIG. 1.

Referring to FIG. 2, a control unit 110a may include a first signal generator 112a for outputting a first signal ON to turn on the switch M and a second signal generator 120a for outputting a second signal OFF to turn off the switch M.

The first signal generator 112a may output the first signal ON after or when a predetermined time has elapsed from when the switch M is turned off so that the control unit 110a can turn on the switch M by outputting the control signal corresponding to the first signal ON. And, the second signal generator 120a may output the second signal OFF when the current flowing through the switch M is greater than the reference current so that the control unit 110a can turn off the switch M by outputting the control signal corresponding to the second signal OFF. The second signal generator 120a may include an integrator 113a. Further, the integrator 113a may integrate the current flowing through the switch M using the preset reference signal $V_{REF}$ and the measured signal Vcs generated by the current flowing through the resistor R. The integrator 113a may include an amplifier 1131a and an integrating capacitor C0a. The amplifier 1131a may have a negative (−) input terminal to receive the measured voltage Vcs and a positive (+) input terminal to receive the reference voltage $V_{REF}$. The integrating capacitor C0a may be connected between the negative (−) input terminal of the amplifier 1131a and an output terminal Va of the amplifier 1131a. Further, a resistor R0a may be connected to the negative (−) input terminal of the integrator 113a. The integrator 113a may further include an initialization switch SW00a connected between the negative (−) input terminal and the output terminal Va of the amplifier 1131a to initialize the integrating capacitor C0a. Additionally, the second signal generator 120a may further include a comparator 114a. The comparator 114a may output the second signal OFF by comparing the reference voltage $V_{REF}$ and the voltage of the output terminal Va of the integrator 113a. The second signal OFF may be output when the output voltage Va of the integrator 113a becomes equal to the reference voltage $V_{REF}$.

Further, the first signal generator 112a and the second signal generator 120a may be connected to an output state setting device 111a, respectively. The output state setting device 111a may output the control signal for turning on the switch M by the first signal ON input from the first signal generator 112a, and output the control signal for turning off the switch M by the second signal OFF input from the second signal generator 120a. The output state setting device 111a may be, for example, but not limited to, a reset set (RS) flip-flop. The first signal generator 112a may be connected to a set terminal of the RS flip-flop, and the second signal generator 120a may be connected to a reset terminal of the RS flip-flop. The control signal output from the output state setting device 111a may be transmitted to the switch M through a buffer 116a to improve signal characteristics.

Figure 3:
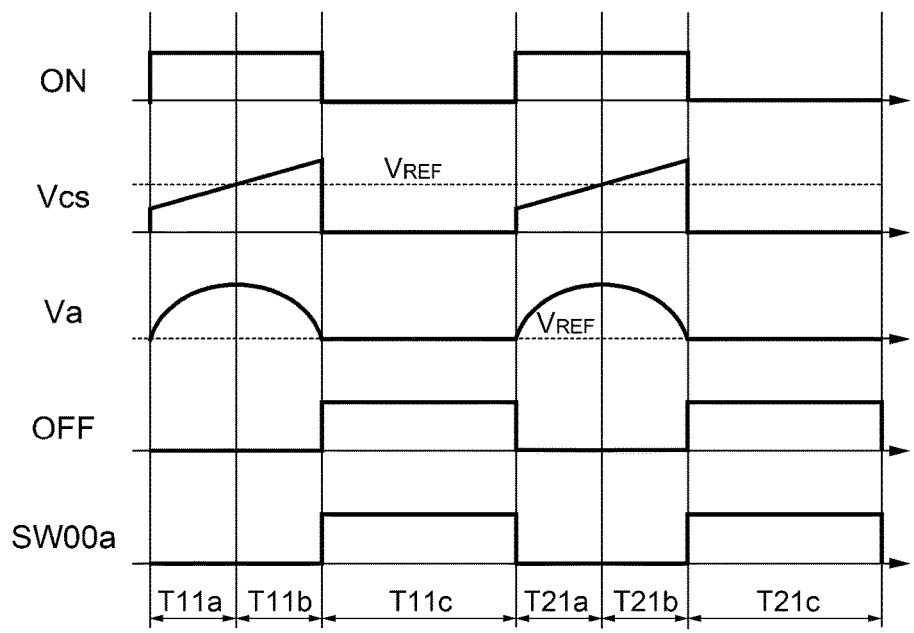
FIG. 3 is a timing diagram showing the operation of the power converter employing the control unit shown in FIG. 2.

FIG. 3 is a timing diagram showing the operation of the power converter employing the control unit shown in FIG. 2.

Referring to FIG. 3, in a first period T11a, the first signal ON for turning on the switch M may be output from the first signal generator 112a and transmitted to the output state setting device 111a. The switch M may be turned on in response to the control signal corresponding to the first signal ON. When the switch M is turned on, the current flows through the inductor L and thus the current can flow through the switch M. The current flowing through the switch M may be transmitted to the resistor R so that the predetermined measured voltage Vcs can be formed in the resistor R. Since the current flowing through the switch M may gradually increase with the passage of time, the measured voltage Vcs formed in the resistor R also may gradually increase. At this time, the output voltage Va of the integrator 113a may gradually increase until the measured voltage Vcs input to the integrator 113a increases to reach the reference voltage $V_{REF}$. And, when the measured voltage Vcs input to the integrator 113a becomes higher than the reference voltage $V_{REF}$, the output voltage Va of the integrator 113a may decrease (See second period T11b). The output voltage Va may decrease to the reference voltage $V_{REF}$. The output voltage of the integrator 113a may be transmitted to the negative (−) input terminal of the comparator 114a, and the reference voltage $V_{REF}$ may be transmitted to the positive (+) input terminal of the comparator 114a. And, the comparator 114a may transmit the second signal OFF for turning off the switch M to the output state setting device 111a when the output voltage Va of the integrator 113a reaches the size of the reference voltage $V_{REF}$ (See third period T11c). Therefore, when the output voltage of the integrator 113a reaches the voltage level of the reference voltage $V_{REF}$, the comparator 114a may output the second signal OFF for turning off the switch M (See third period T11c). The initialization switch SW00a of the integrator 113a may be turned on in the third period T11c by being synchronized with the second signal OFF. When the initialization switch SW00a is turned on, the integrating capacitor C0a may be initialized in the third period T11c. The third period T11c may be an off period.

For example, when the output state setting device 111a is an RS flip-flop, the first signal ON input from the first signal generator 112a may be transmitted to the set signal input terminal of the RS flip-flop, and the second signal OFF input from the second signal generator 120a may be transmitted to the reset signal input terminal of the RS flip-flop. Therefore, since the measured voltage Vcs increases from below the reference voltage VREF to above the reference voltage $V_{REF}$ in the first period T11a, the current flowing through the inductor L in the first period T11a may increase from below to above the reference current. For example, the reference current may be the average of the current flowing through the switch M in the first period T11a. Here, the average of the current flowing through the switch M is not limited to the reference current, and it can be understood that the current flowing through the switch M may reach the reference current even though the average of the current flowing through the switch M reaches an approximate value of the reference current.

Figure 4:
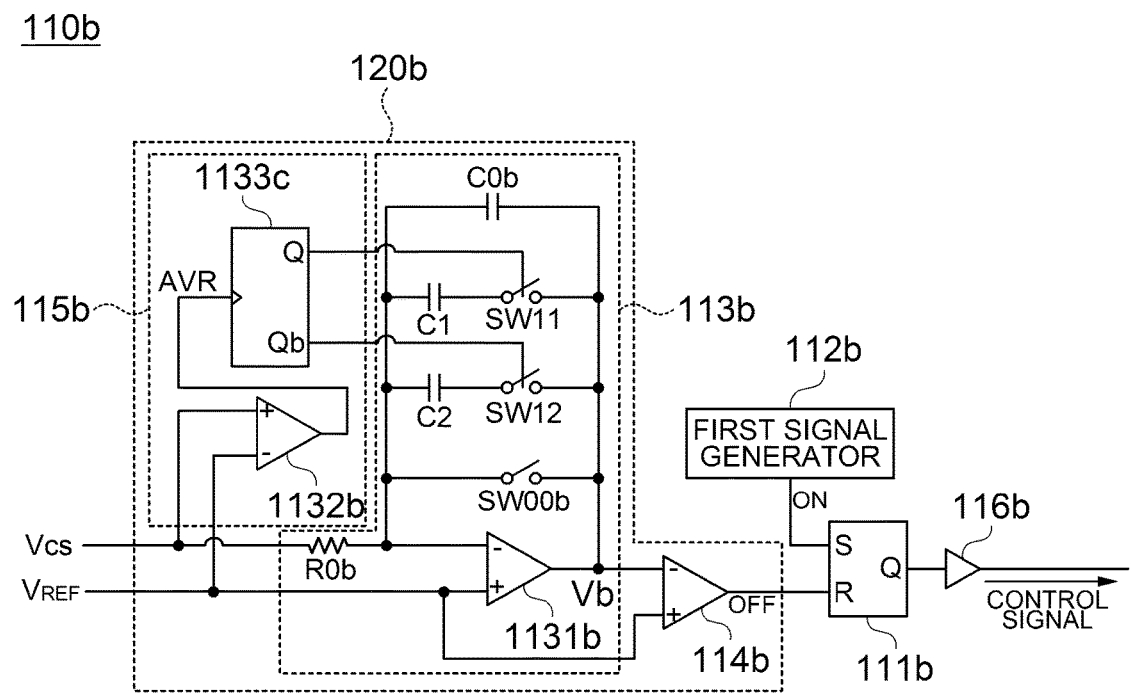
FIG. 4 is a circuit diagram showing a second embodiment of the control unit employed in the power converter shown in FIG. 1.

FIG. 4 is a circuit diagram showing a second embodiment of the control unit employed in the power converter shown in FIG. 1.

Referring to FIG. 4, a control unit 110b may include a first signal generator 112b which may output a first signal ON for turning on the switch M and a second signal generator 120b which may output a second signal OFF for turning off the switch M.

The first signal generator 112b may output the first signal ON after or when a predetermined time has elapsed from when the switch M is turned off so that the control unit 110b can turn on the switch M by outputting the control signal corresponding to the first signal ON. And, the second signal generator 120b may output the second signal OFF when the current flowing through the switch M is greater than the reference current, but may output the second signal OFF when the average of the amount of the current flowing through the switch M in different first and second periods T1 and T2 is equal to the reference current. The control unit 110b may turn off the switch M by outputting the control signal corresponding to the second signal OFF.

The second signal generator 120b may include an integrator 113b. The integrator 113b may operate by dividing a first period T1 and a second period T2 into first sub-periods T12a and T22a in which the current smaller than the reference current flows and second sub-periods T12b and T22b in which the current greater than the reference current flows, respectively. The integrator 113b may output the average current by averaging the amount of the current flowing through the inductor L using the measured voltage Vcs corresponding to the current flowing through the inductor L in the first sub-period T12a of the first period T1 and the measured voltage Vcs corresponding to the current flowing through the inductor L in the second sub-period T22b of the second period T2. That is, by averaging the amount of the current flowing through the switch M in the different two periods, it may be possible to solve, for example, a sub-harmonic problem generated when the amounts of the current flowing through the switch M in the first period T1 and the second period T2 are different from each other.

Further, the integrator 113b may include an amplifier 1131b, an integrating capacitor C0b, a first capacitor C1 and second capacitor C2. The amplifier 1131b may have a negative (−) input terminal to receive the measured voltage Vcs and a positive (+) input terminal to receive the reference voltage $V_{REF}$. The integrating capacitor C0b may be connected between the negative (−) input terminal and an output terminal Vb of the amplifier 1131b. The first capacitor C1 may be connected between the negative (−) input terminal and the output terminal Vb of the amplifier 1131b and connected in parallel with the integrating capacitor C0b in the first sub-period T12a of the first period T1. The second capacitor C2 may be connected between the negative (−) input terminal and the output terminal Vb of the amplifier 1131b and connected in parallel with the integrating capacitor C0b in the second sub-period T22b of the second period T2. A first integrating switch SW11 and a second integrating switch SW12 may be respectively connected in series with the first capacitor C1 and the second capacitor C2 so that the first capacitor C1 and the second capacitor C2 can be selectively connected between the negative (−) input terminal and the output terminal Vb of the amplifier 1131b. And, the second integrating switch SW12 may be turned off when the first integrating switch SW11 is turned on, and the second integrating switch SW12 may be turned on when the first integrating switch SW11 is turned off. Therefore, the integrating capacitor C0b and the first capacitor C1 may be connected in parallel when the first integrating switch SW11 is turned on, and the integrating capacitor C0b and the second capacitor C2 may be connected in parallel when the second integrating switch SW12 is turned on. Further, the integrator 113b may further include an initialization switch SW00b which can initialize the integrating capacitor C0b, the first capacitor C1, and the second capacitor C2.

Further, the second signal generator 120b may include a selection unit 115b which may selectively connect one of the first capacitor C1 and the second capacitor C2 to the integrating capacitor C0b in parallel. The selection unit 115b may control turn-on or turn-off of the first integrating switch SW11 connected to the first capacitor C1 and the second integrating switch SW12 connected to the second capacitor C2 in series.

Further, the first signal generator 112b and the second signal generator 120b may be respectively connected to an output state setting device 111b, and the output state setting device 111b may output the control signal for turning on the switch M in response to the first signal ON input from the first signal generator 112b and output the control signal for turning off the switch M in response to the second signal OFF input from the second signal generator 120b. The output state setting device 111b may be, for instance, but not limited to, an RS flip-flop. The first signal generator 112b may be connected to a set terminal of the RS flip-flop, and the second signal generator 120b may be connected to a reset terminal of the RS flip-flop. The control signal output from the output state setting device 111b may be transmitted to the switch M through a buffer 116b to improve signal characteristics.

In the present embodiment, the selection unit 115b may further include a second comparator 1132b and an integrating switch selector 1133c. The second comparator 1132b may transmit an output signal AVR to the integrating switch selector 1133c according to the difference between the measured voltage Vcs and the reference voltage $V_{REF}$ by receiving the measured voltage Vcs and the reference voltage $V_{REF}$. The integrating switch selector 1133c may turn on the first integrating switch SW11 and the second integrating switch SW12 at different times according to the output signal AVR. The reference voltage $V_{REF}$ may be transmitted to a negative (−) input terminal of the second comparator 1132b, and the measured voltage Vcs may be transmitted to a positive (+) input terminal of the second comparator 1132b. And the integrating switch selector 1133c may output a positive signal Q and a negative signal Qb according to the output signal AVR of the second comparator 1132b, wherein the positive signal Q may be transmitted to the first integrating switch SW11, and the negative signal Qb may be transmitted to the second integrating switch SW12. The integrating switch selector 1133c may be, for example, but not limited to, a toggle flip-flop, and the state of the positive signal Q and the negative signal Qb may be alternately changed on a rising edge of the output signal AVR of the second comparator 1132b.

Figure 5:
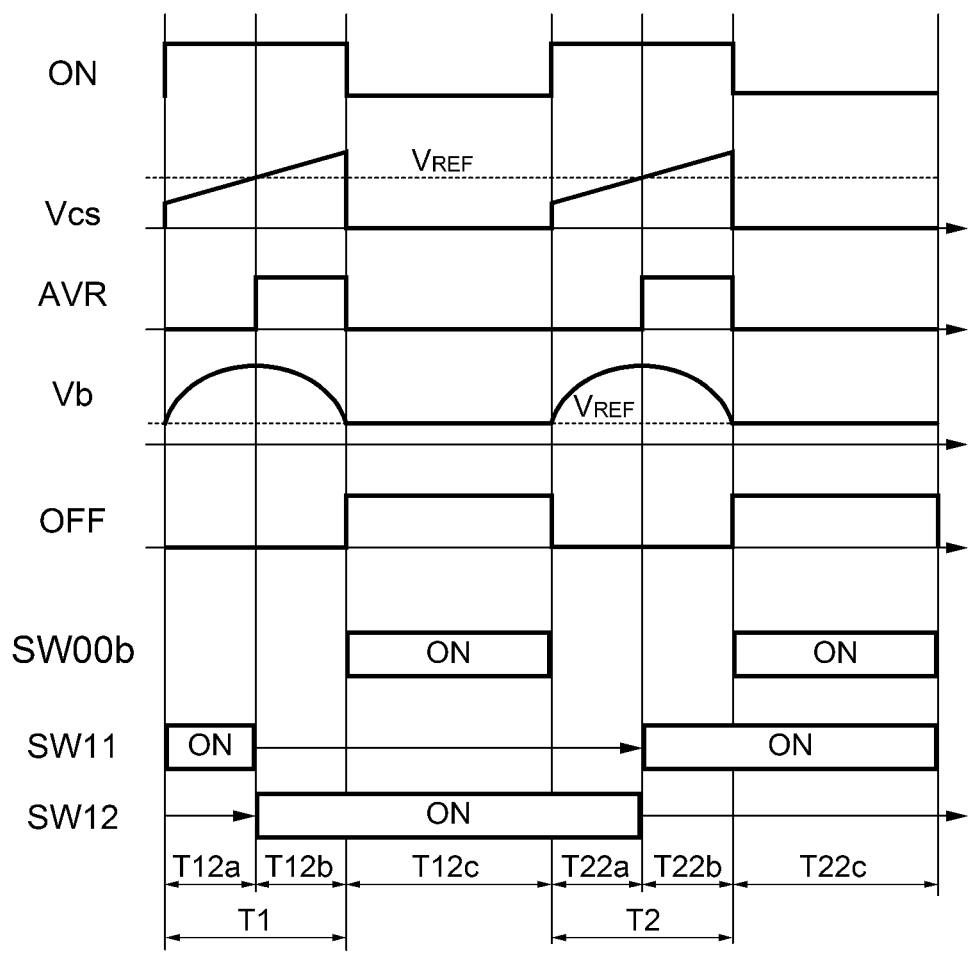
FIG. 5 is a timing diagram showing the operation of the power converter employing the control unit shown in FIG. 4.

FIG. 5 is a timing diagram showing the operation of the power converter employing the control unit shown in FIG. 4.

Referring to FIG. 5, the first signal ON for turning on the switch M in a first period T1 may be output from the first signal generator 112b and transmitted to the output state setting device 111b. The switch M may be turned on by the control signal corresponding to the first signal ON. When the switch M is turned on, the current flows through the inductor L and the current flowing through the inductor L can flow through the switch M. The current flowing through the switch M flows to the resistor R and thus the predetermined measured voltage Vcs is formed in the resistor R. Since the current flowing through the switch M may gradually increase with the passage of time, the measured voltage Vcs formed in the resistor R also may gradually increase. At this time, the first period T1 and the second period T2 may be divided into the first sub-periods T12a and T22a in which the measured voltage Vcs is lower than the reference voltage and the second sub-periods T12b and T22b in which the measured voltage Vcs is higher than the reference voltage. An off period may exist between the first period T1 and the second period T2, the off period after the first period T1 will be referred to as a first off period T12c, and the off period after the second period T2 will be referred to as a second off period T22c.

The output signal AVR of the second comparator 1132b may be in a low state in the first sub-period T12a of the first period T1. When the output signal AVR of the second comparator 1132b is in the low state in the first sub-period T12a, the positive signal Q output from the integrating switch selector 1133c may turn on the first integrating switch SW11, and the negative signal Qb output from the integrating switch selector 1133c may turn off the second integrating switch SW12. Therefore, the integrating capacitor C0b and the first capacitor C1 can be connected in parallel in the first sub-period T12a. Further, the measured voltage $V_{CS}$ may be transmitted to the negative (−) input terminal of the amplifier 1131b of the integrator 113b, and the reference voltage $V_{REF}$ may be transmitted to the positive (+) input terminal of the amplifier 1131b of the integrator 113b. Since the measured voltage $V_{CS}$ is lower than the reference voltage $V_{REF}$ in the first sub-period T12a, the voltage of the output terminal Vb of the amplifier 1131b may increase, and the voltage of the output terminal Vb may be stored in the integrating capacitor C0b and the first capacitor C1. That is, the voltage of the output terminal Vb may be stored in the integrating capacitor C0b and the first capacitor C1 in the first sub-period T12a.

The output signal AVR of the second comparator 1132b may be in a high state in the second sub-period T12b of the first period T1. When the output signal AVR of the second comparator 1132b is in the high state in the second sub-period T12b, since the output signal AVR can include a rising edge in the second sub-period T12b, the state of the positive signal Q and the negative signal Qb output from the integrating switch selector 1133c may be changed. By the change of the signal state, the positive signal Q output from the integrating switch selector 1133c may turn off the first integrating switch SW11, and the negative signal Qb output from the integrating switch selector 1133c may turn on the second integrating switch SW12. Therefore, in the second sub-period T12a, the integrating capacitor C0b and the second capacitor C2 can be connected in parallel. At this time, since the first integrating switch SW11 may be turned off, the first capacitor C1 may be in a floating state. Therefore, the first capacitor C1 can maintain the charged voltage in the first sub-period T12a. Further, since the measured voltage Vcs may be transmitted to the negative (−) input terminal of the amplifier 1131b of the integrator 113b and the reference voltage $V_{REF}$ may be transmitted to the positive (+) input terminal, the measured voltage Vcs is higher than the reference voltage $V_{REF}$ in the second sub-period T12b of the first period T1 and thus the voltage of the output terminal Vb of the amplifier 1131b may be reduced. And, the voltage of the output terminal Vb may be stored in the integrating capacitor C0b and the second capacitor C2. That is, in the second sub-period T12b of the first period T1, the voltage of the output terminal Vb may be stored in the integrating capacitor C0b and the second capacitor C2. And, when the voltage of the output terminal Vb of the integrator 113b becomes the reference voltage $V_{REF}$, a first comparator 114b may output the second signal OFF for turning off the switch M. When the first comparator 114b outputs the second signal OFF, the first off period T12c may start.

In the first off period T12c, the output signal AVR of the second comparator 1132b may be in the low state. Even though the output signal AVR of the second comparator 1132b is in the low state, since the output signal AVR includes a falling edge in the first off period T12c, the state of the positive signal Q and the negative signal Qb of the integrating switch selector 1133c may not be changed. Therefore, in the first off period T12c, the first integrating switch SW11 can maintain the turn-off state, and the second integrating switch SW12 can maintain the turn-on state. And, the initialization switch SW00b may be turned on by being synchronized with the second signal OFF. When the initialization switch SW00b is turned on in the first off period T12c, the second capacitor C2 and the integrating capacitor C0b are initialized, but the first capacitor C1 can maintain the voltage stored in the first sub-period T12a of the first period T1 since the first integrating switch SW11 is turned off.

In the second period T2, the first signal ON for turning on the switch M may be output from the first signal generator 112b and transmitted to the output state setting device 111b. Since the initialization switch SW00b may be synchronized with the second signal OFF, the initialization switch SW00b may be turned off in the second period T2. And, in the first sub-period T22a of the second period T2, the output signal AVR of the second comparator 1132b may maintain the low state. If the output signal AVR of the second comparator 1132b maintains the low state, since the state of the positive signal Q and the negative signal Qb output from the integrating switch selector 1133c are not changed, the first integrating switch SW11 may maintain the turn-off state and the second integrating switch SW12 may maintain the turn-on state. Therefore, in the first sub-period T22a of the second period T2, the integrating capacitor C0b and the second capacitor C2 can be connected in parallel, and the output voltage Vb of the amplifier 1131b may be stored in the integrating capacitor C0b and the second capacitor C2. The voltage stored in the integrating capacitor C0b and the second capacitor C2 may rise from the reference voltage $V_{REF}$. Further, the measured voltage Vcs may be transmitted to the negative (−) input terminal of the amplifier 1131b of the integrator 113b through a resistor R0b, and the reference voltage $V_{REF}$ may be transmitted to the positive (+) input terminal. And, in the first sub-period T22a of the second period T2, since the measured voltage Vcs is lower than the reference voltage $V_{REF}$, the voltage of the output terminal Vb of the amplifier 1131b may gradually increase.

And, in the second sub-period T22b of the second period T2, the output signal AVR of the second comparator 1132b may be changed to the high state. If the output of the second comparator 1132b becomes the high state in the second sub-period T22b of the second period T2, since the output signal AVR may include a rising edge in the second sub-period T22b, the state of the positive signal Q and the negative signal Qb output from the integrating switch selector 1133c may be changed. The positive signal Q output from the integrating switch selector 1133c may turn on the first integrating switch SW11, and the negative signal Qb output from the integrating switch selector 1133c may turn off the second integrating switch SW12. Therefore, in the second sub-period T22b of the second period T2, the integrating capacitor C0b and the first capacitor C1 can be connected in parallel. At this time, the second capacitor C2 may be in the floating state to maintain the previously charged voltage. Therefore, in the second sub-period T22b of the second period T2, the voltage of the output terminal Vb may be charged in the integrating capacitor C0b and the first capacitor C1. Further, since the measured voltage Vcs may be transmitted to the negative (−) input terminal of the amplifier 1131b of the integrator 113b through the resistor R0b and the reference voltage $V_{REF}$ may be transmitted to the positive (+) input terminal, the measured voltage Vcs may be higher than the reference voltage $V_{REF}$ in the second sub-period T22b of the second period T2. Therefore, in the second sub-period T22b of the second period T2, the voltage of the output terminal Vb of the amplifier 1131a may gradually decrease, and the voltage of the output terminal Vb may be stored in the integrating capacitor C0b and the first capacitor C1. That is, in the second sub-period T22b of the second period T2, the voltage of the output terminal Vb of the amplifier 1131b may be stored in the integrating capacitor C0b and the first capacitor C1. Therefore, since the integrating capacitor C0b and the first capacitor C1 can store the voltage in the first sub-period T12a of the first period T1 and can store the voltage in the second sub-period T22b of the second period T2, the integrator 113b can calculate the average current using the voltage stored in the first sub-period T12a of the first period T1 and the voltage stored in the second sub-period T22b of the second period T2. Therefore, it may be possible to solve the sub-harmonic problem occurred when the amounts of the current flowing in the switch M in the first period T1 and the second period T2 are different from each other.

When the voltage of the output terminal Vb of the integrator 113b becomes the reference voltage $V_{REF}$, the first comparator 114b may output the second signal OFF. When the first comparator 114b outputs the second signal OFF, the control unit 110b may enter the second off period T22c. In the second off period T22c, the output signal AVR of the second comparator 1132b may be in the low state. Even though the output signal AVR of the second comparator 1132b is in the low state, since the output signal AVR includes a falling edge in the second off period T22c, the state of the positive signal Q and the negative signal Qb of the integrating switch selector 1133c may not be changed. Therefore, the first integrating switch SW11 can maintain the turn-on state, and the second integrating switch SW12 can maintain the turn-off state. And, the initialization switch SW00b can be turned on by being synchronized with the second signal OFF.

Figure 6:
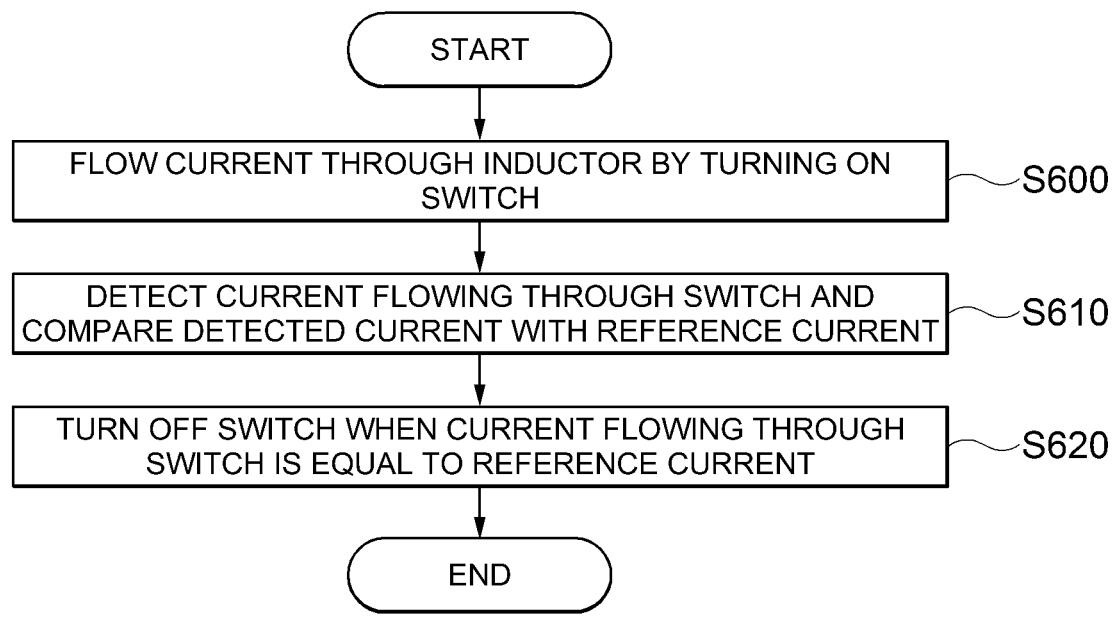
FIG. 6 is a flowchart showing a method for driving a power convertor in accordance with an exemplary embodiment of the present disclosure.

FIG. 6 is a flowchart showing a method for driving a power converter in accordance of an exemplary embodiment of the present disclosure.

Referring to FIG. 6, in the driving method for a power converter which may generate predetermined power by detecting a current flowing through a switch and controlling the switch for switching a current flowing through an inductor, the current may be flown through the inductor by turning on the switch (S600).

The size of the current flowing through the switch may be detected and compared with a preset reference current (S610). The current flowing through the inductor may be transmitted to the switch by the turn-on operation of the switch. Further, the current flowing through the switch may be detected separately in a first period and a second period in which the switch is turned on at different times. And, in the comparison between the current flowing through the switch and the reference current, the first period and the second period may be respectively divided into a first sub-period in which the current flowing through the inductor is smaller than the reference current and a second sub-period in which the current flowing through the inductor is greater than the reference current. The average of the size of the current flowing through the switch in the first sub-period of the first period and the second sub-period of the second period may be compared with the size of the reference current.

Further, a first voltage corresponding to the case in which the current flowing through the switch is smaller than the reference current in the first sub-period of the first period may be stored, and a second voltage corresponding to the case in which the current flowing through the switch is greater than the reference current in the second sub-period of the second period may be stored. The first voltage may be stored through a first capacitor in the first sub-period of the first period, and the second voltage may be stored through a second capacitor in the second sub-period of the second period. An integrator may determine a voltage of an output terminal thereof by adding the voltages stored in the first capacitor and the second capacitor. Further, the second capacitor may be initialized after storing the voltage corresponding to the voltage flowing through the switch in the first capacitor in the first sub-period of the first period and storing the voltage corresponding to the voltage flowing through the switch in the second capacitor in the second sub-period of the second period, and the voltage corresponding to the current flowing through the switch may be stored in the second capacitor in the first sub-period of the second period and the voltage corresponding to the voltage flowing through the switch may be stored in the first capacitor in the second sub-period of the second period again. Therefore, the first capacitor can add the voltage corresponding to the current flowing through the switch in the first sub-period of the first period and the voltage corresponding to the current flowing through the switch in the second sub-period of the second period.

And, when the size of the current flowing through the switch becomes equal to the size of the reference current, the switch may be turned off (S620). The size of the current flowing through the switch may be checked by integration. The integration may be performed using the integrator.

The power converter and the driving method for the same according to some embodiments of the present disclosure, for example, can reduce the error of current control and can simplify the structure of the power converter without elements having a complex structure such as a timer.

The functions of the various elements shown in the drawings may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

In the claims hereof, any element expressed as a means for performing a specified function is intended to encompass any way of performing that function including, for example, a combination of circuit elements which performs that function or software in any form, including, therefore, firmware, microcode or the like, combined with appropriate circuitry for executing that software to perform the function.

Reference in the specification to "an embodiment" of the present principles, as well as other variations thereof, means that a particular feature, structure, characteristic, and so forth described in connection with the embodiment is included in at least one embodiment of the present principles. Thus, the appearances of the phrase "in an embodiment", as well as any other variations, appearing in various places throughout the specification are not necessarily all referring to the same embodiment.

Reference in the specification to "connect" or "connecting", as well as other variations thereof, means that an element is directly connected to the other element or indirectly connected to the other element through another element. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

What is claimed is:

1. A power converter comprising:
   an inductor;
   a switch turned on or turned off according to a control signal to control a current flowing through the inductor; and
   a control unit outputting the control signal to turn on or turn off the switch by integrating a current flowing through the switch to compare the integrated current with a pre-set reference voltage,
   wherein the control unit comprises a first signal generator outputting a first signal corresponding to the control signal for turning on the switch and a second signal generator outputting a second signal corresponding to the control signal for turning off the switch,
   the second signal generator comprises an integrator and integrates the current flowing through the switch,
   the integrator integrates the current flowing through the switch by averaging an amount of the current flowing in a first period and a second period which are different from each other,
   each of the first period and the second period is divided into a first sub-period in which a current smaller than a reference current flows and a second sub-period in which a current greater than the reference current flows, and
   the integrator outputs an average value by averaging the amount of the current flowing through the switch using a measured voltage corresponding to the current flowing through the switch in the first sub-period of the first period and the current flowing through the switch in the second sub-period of the second period.

2. The power converter according to claim 1, wherein the control unit further comprises an output state setting device outputting the control signal of an on state in response to the first signal and outputting the control signal of an off state in response to the second signal.

3. The power converter according to claim 1, wherein the second signal generator further comprises a first comparator outputting the second signal by comparing an output voltage of the integrator with the reference voltage.

4. The power converter according to claim 1, wherein the reference voltage is set using an average value of a voltage generated by the current flowing through the switch in a period in which the switch is turned on.

5. The power converter according to claim 1; wherein the integrator comprises:
   an amplifier outputting a predetermined voltage by receiving the measured voltage at a negative input terminal and receiving the reference voltage corresponding to the reference current at a positive input terminal;
   an integrating capacitor connected between the negative input terminal and an output terminal of the amplifier;
   a first capacitor connected between the negative input terminal and the output terminal of the amplifier and connected to the integrating capacitor in parallel in the first sub-period of the first period;
   a second capacitor connected between the negative input terminal and the output terminal of the amplifier and connected to the integrating capacitor in parallel in the second sub-period of the second period; and
   an initialization switch initializing the integrating capacitor, the first capacitor; and the second capacitor.

6. The power converter according to claim 5, wherein the second signal generator comprises a selection unit selectively connecting the first capacitor and the second capacitor to the integrating capacitor in parallel.

7. The power converter according to claim 6, wherein the selection unit comprises a second comparator and an integrating switch selector; wherein the second comparator receives the measured voltage and the reference voltage and transmits the measured voltage and the reference voltage to the integrating switch selector, and the integrating switch selector connects the first capacitor and the second capacitor to the integrating capacitor at different times according to an output of the second comparator.

8. The power converter according to claim 7, wherein the initialization switch is turned on by being synchronized with the control signal for turning off the switch.

9. A driving method for a power converter which generates predetermined power by detecting a current flowing through a switch and controlling the switch to switch a current flowing through an inductor, comprising:
flowing the current through the inductor by turning on the switch;
detecting a size of the current flowing through the switch and comparing the current flowing through the switch with a preset reference current; and
turning off the switch when the size of the current flowing through the switch becomes equal to the reference current,
wherein the current flowing through the switch is detected separately in first period and a second period in which the switch is turned on, in the comparison between the current flowing through the switch and the reference current,
each of the first period and the second period is divided into a first sub-period in which the current flowing through the switch is smaller than the reference current and a second sub-period in which the current flowing through the switch is greater than the reference current, and
an average of the size of the current flowing through the switch in the first sub-period of the first period and the second sub-period of the second period is compared with the reference current.

10. The driving method for the power converter according to claim 9; wherein the reference current is set using an average of the current flowing through the switch in a period in which the switch is turned on.

11. The driving method for the power converter according to claim 9; wherein the size of the current flowing through the switch is detected by integration.

12. A driving method for a power converter which generates predetermined power by controlling an average current of a current flowing through a switch in a turn-on period of the switch through adjustment of the turn-on period and a turn-off period of the switch to control a current flowing through an inductor, the method comprising:
storing a first voltage in a first capacitor by integrating the current flowing through the switch in a period of the turn-on period of the switch in which the current flowing through the switch is smaller than a reference current;
storing a second voltage in the first capacitor by integrating the current flowing through the switch in a period of the turn-on period of the switch in which the current flowing through the switch is greater than the reference current after the turn-off period and adding the first voltage and the second voltage; and
storing a voltage in a second capacitor by integrating the current flowing through the switch in the period of the turn-on period of the switch in which the current flowing through the switch is greater than the reference current after storing the first voltage in the first capacitor in the turn-on period.

13. The driving method for the power converter according to claim 12, comprising:
initializing the second capacitor in the turn-off period.

\* \* \* \* \*